Patented Jan. 9, 1945

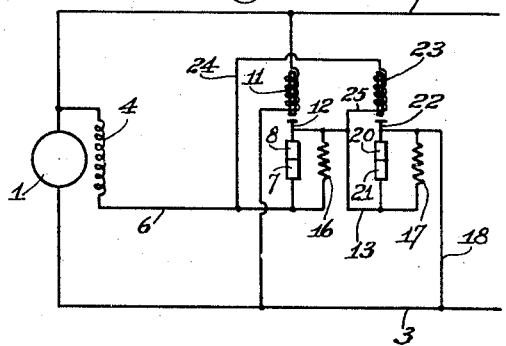
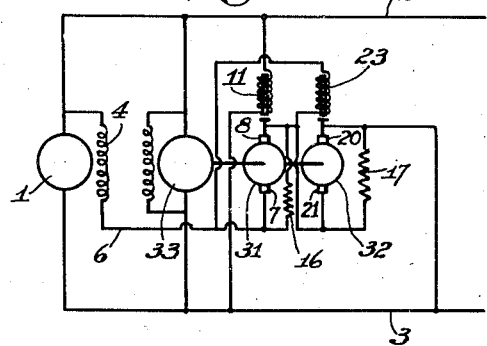
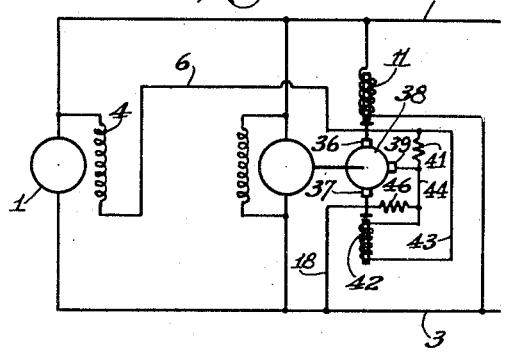
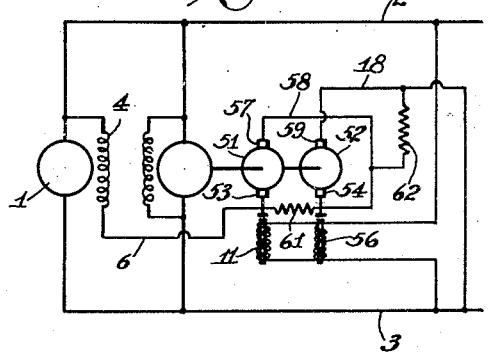
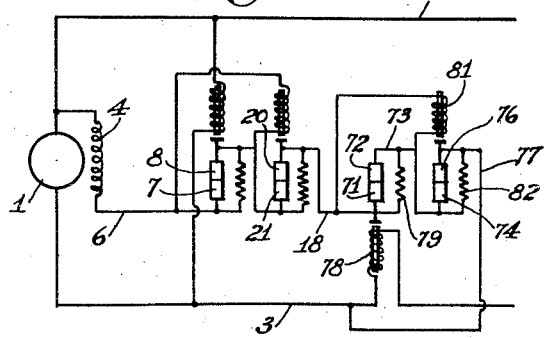

2,366,878

UNITED STATES PATENT OFFICE 2,366,878

GENERATOR REGULATOR

Erle I. Shobert, II, John E. Diehl, and Alfred J. Schutz, St. Marys, Pa., assignors to Stackpole Carbon Company, St. Marys, Pa., a corporation of Pennsylvania Application July 14, 1942, Serial No. 450,858

1 Claim. (Cl. 171—229)

This invention relates to apparatus for automatically regulating the output of generators, by which is meant either their voltage output or their current output, or both.

In a well known type of generator regulator the field coil circuit of a generator is controlled by a normally closed switch that is opened periodically by a solenoid shunted across the generator when the voltage is to be regulated, or connected in series with the generator in case the current is to be regulated. When the generator output starts to exceed the maximum value for which the solenoid has been set, the latter opens the field circuit switch, whereupon the rise in output is arrested and starts to drop. This drop immediately causes the solenoid to permit the field circuit switch to close, so the output of the generator increases again before it can fall appreciably. In practice this opening and closing of the field circuit switch generally occurs many times per second in order to keep the generator output substantially constant.

One of the big problems in connection with the operation of such regulators is that when the field circuit of a generator is opened by a regulating switch the voltage across the separating switch contacts is very high, due to the inductive kick generated by inductance of the field. This high voltage causes sparking between the contacts and, consequently, excessive wear. At low atmospheric pressures, such as found at high altitudes when generators are used in aviation service, the voltage across a set of separating regulator contacts should not exceed about 26½ volts, because if it does there is a very vicious arc discharge.

It is among the objects of this invention to provide a generator output regulator in which the arcing between the regulator contacts is greatly reduced, in which the life of those contacts is prolonged materially, in which the regulation may be carried out by one solenoid and one set of contacts, and in which only one accurately calibrated regulator coil is necessary.

According to this invention a set of normally engaging electrical conductors is connected in series in the field coil circuit of a generator the output of which is to be regulated. An electrical resistor shunts the conductors, and one or more auxiliary resistors are connected in series with the first resistor. Means, such as electromagnetic means operably connected to one of the conductors and responsive to the output of the generator, is provided for separating the conductors when the output reaches a predetermined value whereby the first resistor is added to the field circuit. Additional electrically operated means are provided for thereafter adding the auxiliary resistance to the circuit. The second electrically operated means may be shunted across the conductors just mentioned or it may be shunted across the generator circuit. Neither resistor has enough resistance in itself to keep the generator output from exceeding the desired value under all conditions, but when they are joined together in series in the field circuit of the generator the total resistance is sufficient for that purpose. The first resistor has quite a low value so that there is a low voltage across the regulating conductors when they are opened, but the auxiliary resistance must have a value high enough to add the necessary additional resistance to the circuit.

The invention is illustrated in the accompanying drawing in which Fig. 1 is a circuit diagram showing our invention used with stationary or non-sliding regulator contacts; Fig. 2 shows the invention used with sliding contacts driven by a motor; Fig. 3 is similar to Fig. 2 except that only one slip ring is used; Fig. 4 is similar to Fig. 2 except that both sets of regulator contacts are controlled directly by the generator voltage; and Fig. 5 is the same as Fig. 1 with the addition of a regulator for the current output of the generator.

Referring to Fig. 1 of the drawing, a shunt wound generator 1 has current leads 2 and 3 extending away from it with lead 2 connected directly to its field coil 4. The other end of the field coil is connected to the other lead indirectly through the regulator that forms this invention. More specifically, the field coil is connected by a wire 6 to one of a pair of normally engaging or closed regulator contact members, preferably the fixed contact 7. One of these contacts, the upper one 8 shown in the drawing, is adapted to be moved toward and away from the other contact in order to regulate the output of the generator. The upper contact normally is held against the lower one by any suitable means, such as a spring (not shown), but to separate the contacts every time the generator voltage attempts to exceed a predetermined value a solenoid 11 is shunted across the generator between the leads 2 and 3. When the voltage reaches a predetermined value it energizes the solenoid sufficiently to cause the solenoid to draw the upper contact away from the lower one.

The T-shaped member 12 connected to the top of contact 8 represents the armature that is attracted by the solenoid and that lifts the contact.

As the form of this armature and the way it is associated with the solenoid and reciprocable contact do not form a part of this invention a more detailed illustration is deemed unnecessary, especially since reference may be made to the copending patent application Serial No. 378,331, filed February 11, 1941, by Erle I. Shobert, II, for a suitable assembly of solenoid, armature, spring and reciprocable contact.

The field coil circuit is completed by a wire 13 connecting contact 8 through additional elements, as will be explained presently, with lead 3 from the generator. The voltage regulator described thus far operates in the same way as the usual regulator referred to at the beginning of this specification.

It is a feature of this invention, however, that when the regulator contacts 7 and 8 are separated by solenoid 11, undesirable and harmful arcing does not occur between the contacts. This is because a resistor 16 is shunted around the contacts so that the field circuit is not entirely broken when the contacts are separated, and the resistor is of low enough resistance value that the voltage across the contacts when they are opened is not high enough to cause appreciable arcing. As such a resistor does not by itself place sufficient resistance in the field circuit to control the voltage of the generator over its entire range of speed and load, a second or auxiliary resistor 17 is connected in the field circuit in series with the first resistor between wire 13 and wire 18 connected to lead 3. The resistance value of the second resistor is high enough that when it is added to the first one the combined resistance in the field circuit is sufficient to properly control the generator.

To shunt the second resistor out of the circuit when it is not wanted, which is when contacts 7 and 8 are closed, a second set of contacts 20 and 21 is connected to the wires 13 and 18 in parallel with resistor 17. As in the first set the upper contact 20 of the second set is movable toward and away from the lower one, which it normally engages, and is connected to a solenoid armature 22. To open the second set of contacts a solenoid 23 is mounted adjacent armature 22 and is shunted around the first set of contacts by wires 24 and 25 by which it is connected to wires 6 and 13, respectively. When contacts 7 and 8 are opened the voltage across them causes solenoid 23 to open the second set of contacts 20 and 21 and add the auxiliary resistor 17 to the field coil circuit of the generator. The two sets of contacts thus open in succession so that the voltage across neither set when it opens is harmfully high. The resistance value of the main resistor 16 should be lower than that of the auxiliary resistor because there are more amperes of field current to contend with at the first set of contacts than at the auxiliary set of contacts while the first set is open. Of course, a series of auxiliary resistors and associated contacts and solenoids may be used if found necessary in any particular case.

As an example of the way in which this regulator can control the voltage of a generator without causing material arcing, assume that it is desired to regulate the voltage of a 28-volt generator which generates 10 amperes of field current, and that it requires 75 ohms resistance in the field circuit to hold the voltage down to a desired value over the entire range of speed and load. If that much resistance were cut in and out of the circuit all at once by one set of contacts the voltage across those contacts as they separate would be 10 amps.×75 ohms which would equal 750 volts. That much voltage would cause severe arcing and rapid deterioration of the contacts. On the other hand, if the invention disclosed herein is used and the first resistor has only 10 ohms resistance, when the first set of contacts open the voltage across them will be 10 amps.×10 ohms or 100 volts. The 10 ohm resistor reduces the field current from 10 amps. to about 2.18 amps. so that the voltage across the second set of contacts shunted by an auxiliary resistor having a resistance value of 65 ohms is 142 volts. In neither case is the voltage high enough to be particularly harmful to the regulating contacts; therefore their life is prolonged.

The actual regulation is carried out by solenoid 11 and contacts 7 and 8, because that solenoid is the only one affected by the generator voltage. Consequently, solenoid 11 is the only one that needs to be accurately calibrated. The other solenoid and contacts are operated only by the voltage across contacts 7 and 8, so higher generator voltages are not necessary in order to open the second set of contacts. Regulation of the generator can thus be closely controlled.

The embodiment of the invention disclosed in Fig. 2 has the same circuit as Fig. 1, but it has the advantage that sliding contacts are used so that their engaging surfaces are kept smooth and clean. With ordinary reciprocable contacts like those shown in Fig. 1 contact material gradually is removed from the contact face of one contact and deposited on the face of the other one. This gradually changes the regulating point and eventually results in sticking of the contacts. These difficulties are overcome in the regulator of Fig. 2 by using sliding contacts formed from a pair of slip rings 31 and 32 or the like that are rotated by an electric motor 33 which receives its power from the leads 2 and 3 of the generator. As in Fig. 1, a pair of reciprocable conductors 8 and 20 are used, but they engage the rotating slip rings instead of the fixed contacts 7 and 21 which in this case conduct electric current to or from the rings. The rotating rings prevent contact material from building up on the contact surfaces and keep those surfaces clean and polished. The solenoids 11 and 23 and the resistors 16 and 17 function in the same manner as previously described herein.

The sliding contact principle can be used with only one slip ring, if desired, as shown in Fig. 3. In this case both of the reciprocable contacts 36 and 37 engage the motor driven slip ring 38 which is also engaged by a stationary third contact 39. The wire 6 from the field coil 4 of the generator is connected to one of the reciprocable contacts 36, and the other reciprocable contact 37 is connected by a wire 18 to the lower lead 3 from the generator. The slip ring itself completes the field coil circuit. When the voltage output of the generator reaches the point where the solenoid 11 connected across the generator draws the upper contact away from the slip ring, the electric current flows from that contact through a resistor 41 and the stationary contact 39. A solenoid 42, positioned to attract the lower contact 37, is connected in parallel with resistor 41 by wires 43 and 44 so that the voltage across the upper contact and the slip ring will cause the lower solenoid to draw the lower contact away from the ring. The ring is thus removed entirely from the circuit, so the current flows from resistor 41 through a second resistor 46 connected to wire 44 and the wire 18 connecting the lower contact to the lower lead 3 of the generator. In this way both resistors are placed in the field coil circuit, one after the other, and the arcing at neither reciprocable contact is excessive.

In the modification shown in Fig. 4 two motor driven slip rings 51 and 52 are used, but both reciprocable contacts 53 and 54 are actuated by solenoid 11 and 56, respectively, connected across the generator so that both solenoids are directly responsive to the generator voltage. In this case the field coil 4 of the generator is connected by wire 6 to one of the reciprocable contacts 53 so that the current flows through the adjoining slip ring 51 and into the opposite stationary contact 57 which is connected by a wire 58 to the other reciprocable contact 54 on the other ring. The current flows through the second ring and the contact 59 engaging it and through a wire 18 to the lower lead 3 of the generator, thus completing the field circuit. A resistor 61 is connected to the two reciprocable contacts, and another resistor 62 connects wire 58 to wire 18. As it would be extremely difficult to make a regulator of this character in which both solenoids would separate both reciprocable contacts from their adjoining slip rings at exactly the same instant, this fact can be relied upon to assure the contacts leaving the slip rings in succession practically all the time.

Whichever contact leaves the adjoining slip ring first, only one of the resistors is placed in the circuit, the second resistor being added as soon as the other contact leaves its slip ring. Thus, if contact 53 leaves ring 51 first, the current flows through resistor 61 between the two contacts and through the second ring to the lower lead of the generator. As soon as contact 54 leaves ring 52 the current must flow from that contact through the second resistor 62 to wire 18. On the other hand, if contact 54 opens first, then the current continues to flow through slip ring 51 but around ring 54 by way of resistor 62, and when contact 53 opens, the current must flow through resistor 61 also that connects the two reciprocable contacts. It will therefore be seen that this regulator operates entirely from the voltage across the generator and not from a combination of that voltage and the voltage across the first pair of contacts to open.

Any of the above-discussed regulators may be used for regulating the current output of a generator rather than its voltage output by merely connecting the first solenoid 11 in series in one of the generator leads. Also, such a current regulator can be used in combination with a voltage regulator so that both the current and voltage output of a generator are regulated. This latter system is illustrated in Fig. 5 of the drawing where the generator voltage is regulated in exactly the same manner as in Fig. 1 by the two left-hand pairs of contacts 7 and 8 and 20 and 21.

To provide for regulating the generator current also, the wire 18 that normally would connect contact 20 of the voltage regulating contacts to the lower lead 3 of the generator is not connected directly to that lead as in Fig. 1, but is connected to the interposed current regulating elements. Thus, this wire leads to a reciprocable contact 71 normally engaging a fixed contact 72 which is connected by a wire 73 to a fixed contact 74 of a fourth pair of contacts. Contact 74 is normally engaged by a reciprocable contact 76 connected by a wire 77 to the lower lead of the generator. The first pair of contacts are opened by a solenoid 78 connected in series in the lead 3 of the generator, and when this occurs the current must flow around the open contacts through a resistor 79. The voltage across the open contacts energizes a solenoid 81 shunted across them and mounted in position to draw the last reciprocable contact 76 away from contact 74 that it normally engages. As soon as this last set of contacts is opened the current must flow through a resistor 82 that shunts those contacts. Consequently, both resistors are added to the field coil circuit so that the current output of the generator will be properly regulated.

Of course, it will be obvious that the last two sets of contacts open and close entirely independently of the first two sets that regulate the voltage. That is, the last two may be functioning to hold down the current output of the generator while the first two sets remain closed due to the fact that the voltage has not yet reached a point where it needs to be regulated, or vice versa. In most cases, however, all four sets of contacts will be opening and closing more or less continuously to keep the voltage and current from exceeding the desired predetermined value for which the regulator is designed or adjusted.

It will also be obvious that the sliding contacts shown in Figs. 2, 3 and 4 may be used in place of the stationary contacts of Fig. 5.

According to the provisions of the patent statutes, we have explained the principle and construction of our invention and have illustrated and described what we now consider to represent its best embodiment. However, we desire to have it understood that, within the scope of the appended claims, the invention may be practiced otherwise than as specifically illustrated and described.

We claim:

A generator output regulator comprising a set of normally engaging electrical conductors, a relatively low value electrical resistor shunting said conductors, a second set of normally engaging electrical conductors in series with the first set, a relatively high value resistor shunting the conductors of said second set, both sets of conductors being adapted to be electrically connected in series in the field coil circuit of a generator and being closed when the generator is not operating, electromagnetic means adapted to be electrically connected in and energized by the generator armature circuit for separating the first set of conductors when the generator output reaches a predetermined value whereby to add said low value resistor to the field coil circuit, and electromagnetic means shunted across the conductors of said first set and adapted to be energized by the voltage across them when they are separated whereby to separate said second set of conductors to add said high value resistor to the field circuit.

ERLE I. SHOBERT, II.
JOHN E. DIEHL.
ALFRED J. SCHUTZ.